United States Patent [19]

Evans

[11] Patent Number: 5,548,803
[45] Date of Patent: Aug. 20, 1996

[54] DUAL-MODE BOOSTER SYSTEM

[75] Inventor: Michael W. Evans, Forest, Va.

[73] Assignee: Orion Industries, Inc., Cleveland, Ohio

[21] Appl. No.: 861,209

[22] Filed: Mar. 31, 1992

[51] Int. Cl.$^6$ .................................................. H04B 7/155
[52] U.S. Cl. ............................ 455/16; 455/17; 455/56.1
[58] Field of Search ............................ 455/11.1, 15, 17, 455/20, 54.1, 56, 16, 69, 70, 33.1, 59, 63

[56] References Cited

U.S. PATENT DOCUMENTS

| 4,941,200 | 7/1990 | Leslie et al. | 455/17 |
| 5,175,871 | 12/1992 | Kunkel | 455/69 |
| 5,276,686 | 1/1994 | Ito | 455/33.1 |

OTHER PUBLICATIONS

Spragins et al "Telecommunications Protocols & Design" Addison–Wesley Publishing Company, Inc, pp. 60–63, 631, 1991.
EIA/TIA—PN2759 document entitled "Cellular System Dual–Mode Mobile Station—Base Station Compatibility Standard", Unofficial Letter—Ballot Version, Aug. 1991, pp. 1–272.

Primary Examiner—Reinhard J. Eisenzopf
Assistant Examiner—Thanh Le
Attorney, Agent, or Firm—Dressler, Goldsmith, Shore & Milnamow, Ltd.

[57] ABSTRACT

A booster usable in a radio telephone communication system can amplify and repeat both analog and digital representations of communications. The unit monitors control channel communications going to subscriber units and reverse control channel responses from subscriber units. When a digital traffic channel assignment is detected, the booster directs the subscriber unit to a different traffic channel pair. The booster communicates with the subscriber unit on the traffic channel pair assigned by it to the subscriber unit. The booster communicates with the cell site on the channel pair assigned by the cell site. Digitized communications from the subscriber unit are amplified only during the associated time intervals. Hence, other communications in different time intervals on the same message channel are not effected. Analog conversations and other message channels can be simultaneously boosted and retransmitted.

9 Claims, 5 Drawing Sheets

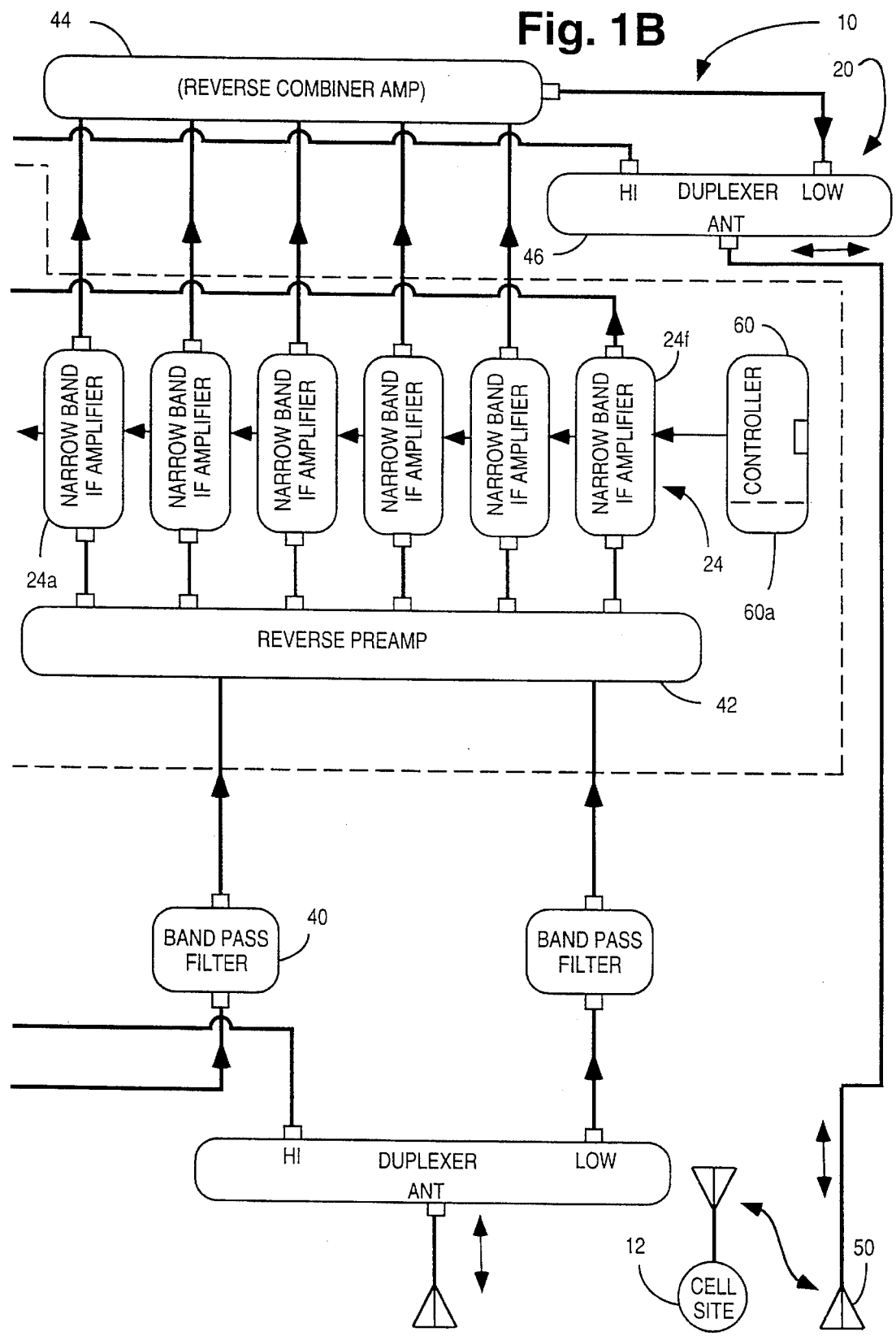

SLOT FORMAT MOBILE STATION TO BASE STATION

SLOT FORMAT BASE STATION TO MOBILE STATION

DUAL-MODE BOOSTER SYSTEM

FIELD OF THE INVENTION

The invention pertains to radio frequency repeaters or boosters. More particularly, the invention pertains to boosters or repeaters usable in radio telephone systems, wherein the messages may be transmitted in either a digital or an analog format.

BACKGROUND OF THE INVENTION

Numerous cellular radio telephone systems have been implemented and are in commercial use in the U.S., Europe, and Japan. Most of the commercially operational systems are analog systems in that the messages are transmitted in analog form using a modulated carrier.

Boosters or repeaters are available for use with commercially operating analog systems. One such booster is disclosed in Leslie etal., U.S. Pat. No. 4,941,200, assigned to the assignee of the present invention. Such boosters, when installed in areas of poor or limited coverage, can substantially improve performance and customer satisfaction.

Newly evolving systems represent the messages in a digital format. These so-called "digital cellular systems" are attractive to operators in that they will improve the quality of communications as far as the user is concerned. They can also substantially increase user capacity as compared to presently available user capacity.

EIA Interim Standard 54 outlines a "Dual-Mode Mobile Station—Base Station Compatibility Standard". Dual-mode systems are capable of operating in either an analog mode or a digital mode. In analog mode, the conversations are FM modulated onto a carrier in conventional fashion. A single conversation requires a 30 Khz channel.

In digital mode, the conversations are digitized according to IS-54, and transmitted digitally. By using time division multiplexing, three to six digital conversations can be multiplexed onto a single 30 Khz channel.

IS-54 specifies a control channel scheme which is upwardly compatible with the prior EIA 553 specification which outlines AMPS-type analog only compatibility. Analog only portable cellular units or mobiles can operate on a dual-mode system without modification.

When a movable unit accesses a dual-mode system, part of the service request message indicates the movable unit's ability to operate in digital mode. The cellular system can then assign the movable unit to a digital traffic channel and time slot within the channel. In the digital mode, the movable units' transmissions are relatively short bursts of data aligned such that 3–6 movable units may use a single channel.

Known repeater or booster structures, such as disclosed in the above-noted Leslie et al. patent, are intended to be used with commercially operational cellular analog systems. As such, they do not have the capability to properly retransmit or boost digital messages or conversations of the type envisioned by the above-noted EIA Interim Standard 54.

Thus, there continues to be a need for booster or repeater systems usable in radio telephone systems which are compatible with dual mode analog and digital, or completely digital cellular radio telephone systems. Preferably, such boosters would be usable with existing analog systems on an interim basis, if desired.

SUMMARY OF THE INVENTION

A multiple mode repeater which is usable between a fixed, remote, transmitter/receiver site, and a subscriber or movable unit, which may be in a coverage area of the fixed site, which receives inadequate signals from the site, includes a first plurality of signal paths for receiving signals from the fixed site and for retransmitting signals to the movable unit. A second plurality of signal paths is also provided for receiving signals from the movable unit and for retransmitting signals to the fixed site.

A control unit, which can include a preprogrammed microprocessor, is coupled to both pluralities of signal paths. The control unit includes storage usable for determining whether a signal received at a given frequency includes a digital representation of a message, or an analog representation of a message.

In one aspect of the invention, circuitry can be provided for determining whether or not the selected, movable unit can generate digital representations of messages. In yet another aspect of the invention, circuitry can be provided for determining when a selected digital representation of a message from a movable unit is to be retransmitted, and for amplifying that representation prior to retransmission.

In yet another aspect of the invention, circuitry can be provided for measuring the signal strength of received signals and for determining if a signal received from a selected movable unit, which signal includes a digital representation of a message, exceeds a predetermined threshold. Additional circuitry is provided responsive to the monitoring circuit for decoding the digital representation.

Circuitry can also be provided for transmitting a control message to the selected unit to cause that unit to alter a frequency parameter of the signal being transmitted therefrom. Storage can also be provided for determining if a signal received at a selected frequency from the selected unit includes an analog representation of a message. Circuitry can be provided for retransmitting those analog representations.

In yet another aspect of the present invention, the repeater can include circuitry for retransmitting a signal with a digital representation of a message simultaneously while retransmitting a signal with an analog representation of a different message.

Circuitry can also be provided for translating a frequency parameter of a received signal from a first value to a second value when a corresponding signal is being retransmitted. Thus, in a digital cellular system, the movable unit being serviced by the booster will operate on booster assigned channels.

In a preferred embodiment of the invention, a repeater or booster can be used in a cellular radio-telephone communication system which supports both an analog message format and a digital message format. Such a booster includes circuitry for detecting whether or not a movable unit is equipped to transmit digital representations of messages, and further circuitry to retransmit to the movable unit, from the remote site, an amplified digital message format intended only for the subject movable unit.

In one aspect of the invention, the booster can include circuitry for intercepting a digital traffic channel assignment, for changing the channel designation, and for retransmitting the changed designation, causing the target movable or mobile unit to go to a repeated channel rather than the assigned channel.

In yet another aspect of the invention, circuitry can be provided for repeating a digital traffic channel in the reverse direction by enabling the reverse retransmit path only during the assigned time slot. This minimizes interference with subscriber unit units operating direct to the call site on a cell site assigned channel.

In yet another aspect of the invention, circuitry for scanning digital traffic channels for signal strength and then decoding the subscriber unit transmitted signal identifies the channel and time slot of potential candidates for repeating.

In yet another aspect of the invention, circuitry for sending a handoff message to a mobile or movable unit on a repeated digital traffic channel causes that unit to begin functioning on a translated channel in the same time slot.

These and other aspects and attributes of the present invention will become increasingly clear upon reference to the following drawings and accompanying specification.

BRIEF DESCRIPTION OF THE DRAWINGS

FIG. 1A–B is a overall block diagram of a dual-mode booster capable of boosting digital communication signals in accordance with the present invention;

DETAILED DESCRIPTION OF THE PREFERRED EMBODIMENT

Figure 1A:
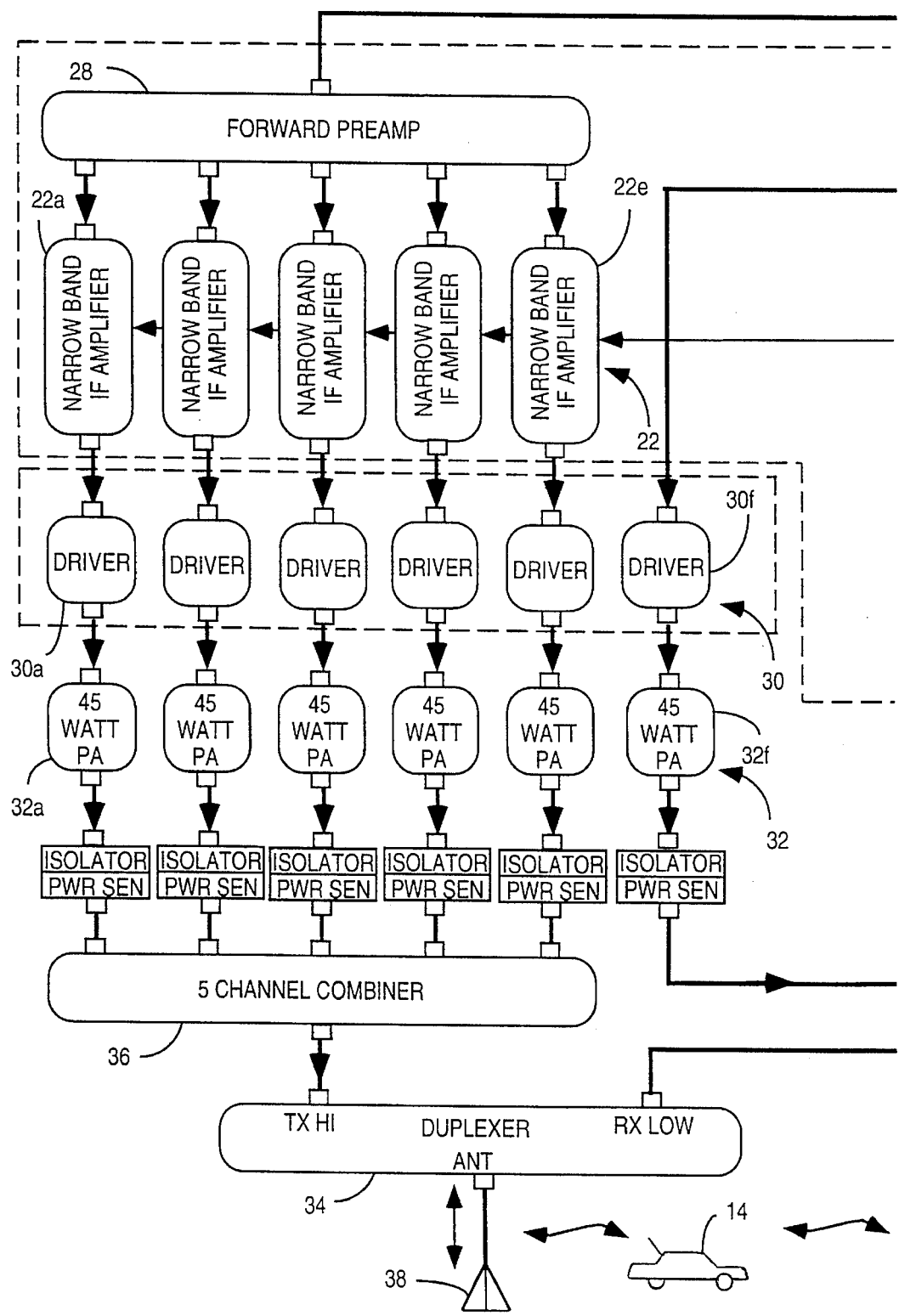

While this invention is susceptible of embodiment in many different forms, there is shown in the drawing, and will be described herein in detail, specific embodiments thereof with the understanding that the present disclosure is to be considered as an exemplification of the principles of the invention and is not intended to limit the invention to the specific embodiments illustrated.

FIG. 1 illustrates a portion of a radio-telephone system 10 which could be a cellular dual-mode system, as described in the above-noted EIA Standard 54B. It will be understood that the present invention is not limited to digital cellular radio-telephone systems of that type. It may also find applicability in other types of digital cellular systems, such as Enhanced TDMA.

The system 10 includes at least one cell site 12. The site 12 can, for example, function in accordance with the above-noted EIA Standard to provide both analog and digital cellular service to subscriber or movable units, such as subscriber unit 14, within its coverage area.

To improve or extend coverage of the site 12, a dual-mode booster or repeater 20 can be used. The booster 20 includes a first plurality of narrow band IF amplifier channels 22 and a second plurality of narrow band IF amplifier channels 24. The first plurality 22 amplifies and retransmits selected signals from the cell site 12 to service the movable unit 14 in the area of coverage provided by the booster 20. Each of the members 22a–22e of the first plurality receives an input from a forward preamplifier 28.

Outputs from each of the members 22a–22e are each coupled through members of a plurality of drivers 30 and output amplifiers 32 to an output combiner 34. The output power amplifier 32 could be, for example, 45 watt class AB linear power amplifier. The output combiner 34 can be self-tuning or it can be a fixed, pre-tuned, combiner dedicated to a plurality of predetermined channels.

Output from the combiner 34 is coupled to a duplexer 36. The duplexer 36 is in turn coupled to an antenna 38. The antenna 38 radiates to, and receives radiant energy from, the subscriber unit 14.

Output from the duplexer 36, corresponding to radiant energy received from the subscriber unit 14, is processed in a band pass filter 40 and then provides an input into a reverse preamplifier 42. Output from the reverse preamplifier 42 provides an input to each of the reverse channel narrow band IF amplifiers 24.

The outputs of each of the narrow band amplifiers 24a–24e are coupled to a reverse combiner and amplifier 44. Output from the combiner and amplifier 44 is in turn coupled to a duplexer 46. Output from the duplexer 46 feeds an antenna 50.

The antenna 50 receives radiant energy from, and transmits radiant energy to, the remote cell site 12. A second output from the duplexer 46 is an input to the forward preamplifier 28.

A control element 60 is coupled to each of the members of the pluralities 22, 24. The control element 60 provides the ability to analyze digital signals received from the movable unit 14, as well as those from the cell site 12.

The control element 60 also includes a programmed microprocessor 60a. Additional microprocessors or control circuitry can be located at the members of the pluralities 22 and 24. Representative narrow band IF amplifier channels are illustrated in the above-noted Leslie et al. patent.

Figure 2A:
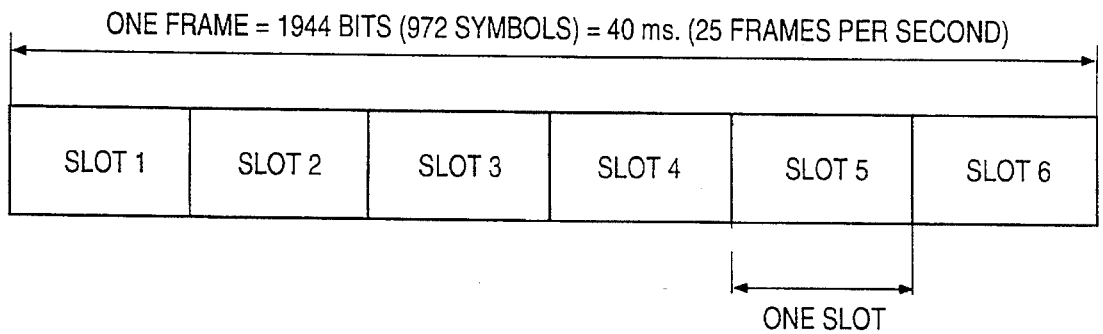
FIG. 2A is a diagram of an exemplary multiple time slot digital message format.

FIG. 2A illustrates one frame of a digital radio frequency message slot, in accordance with the above-noted EIA Standard IS 54B. Each frame includes a total of six slots for communicating with up to six different movable units, such as the movable unit 14.

Figure 2B:
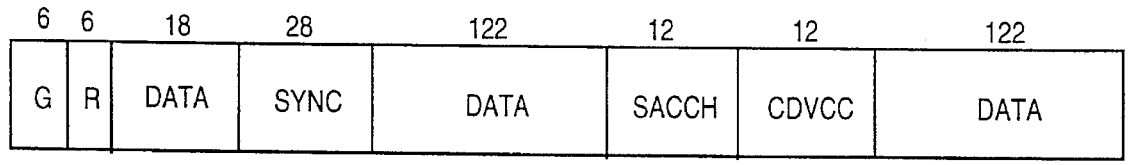
FIG. 2B is a detailed diagram of a slot format, movable unit to cell site.
Figure 2C:
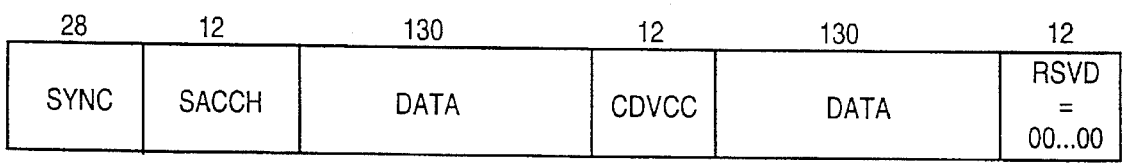
FIG. 2C is a detailed diagram of a slot format, cell site to movable unit.

FIG. 2B is an illustration of the format of each of the six slots of FIG. 2A for transmissions from the subscriber unit, such as subscriber unit 14, to the related cell site 12. FIG. 2C illustrates the format of each of the slots 1–6 of FIG. 2A for transmissions from the cell site 12 to the movable unit 14.

The DATA characters of the slot format of FIGS. 2B or 2C can include a digitized portion of an ongoing call being carried on between the site 12 and the movable unit 14. The contents of the various data fields for FIGS. 2B, 2C are defined in the above-noted Standard IS5 4B.

To identify message originate or answer movable unit candidates, one channel pair, such as 22a, 24a, is assigned to repeat the control channel to/from the movable unit. The donor side (i.e, from channel 22a receive and to channel 24a transmit) channels are set to the control channel of the serving or donor cell site 12. The subscriber unit 14 or repeated side (i.e. channel 22a transmit and channel 24a receive) channels are set to an arbitrary other channel within a specified set of control channels.

This control channel repeating is necessary to provide coverage to movable units or mobiles in the repeater coverage area which are not currently in a conversation. The subscriber unit units "self locate". At predetermined times, they rescan the dedicated set of control channels and use the strongest channel that they receive. This means that subscriber unit units within the coverage area of repeater 20 operate on the translated, repeated control channel (i.e., they listen to what the channel 22a is transmitting, and transmit on the receiving channel 24a).

To identify subscriber unit candidates in the coverage area of repeater 20 that initiate communication or place calls, the control data streams transmitted on these channels are monitored by the control unit 50. Subscriber units and other movable units either access cell site 12 or page respond on the reverse repeated channel 24a, and each indicates whether it is equipped for digital operation. Subsequently, the site 12 assigns either an analog traffic or voice channel, or a digital traffic or voice channel, plus time slot to each respective unit.

The repeater 20 monitors the reverse channel, via signal path 24a, for access or page responses from the movable unit 14. Then, it monitors the forward channel, via amplifier channel 22a, for the corresponding channel assignment and type. The repeater 20 can then identify when movable units or subscriber units are about to begin a conversation, the mode that will be used (analog or digital), and the channel that the donor site 12 has assigned to the unit, such as unit 14.

For movable units or subscriber units that originate or answer a call in the repeater coverage area, channel and time slot assignments are transmitted on the forward control channel from the site 12 and are monitored via signal path 22a. To cause the unit 14 to change channels, the repeater 20 intercepts and recodes the channel assignment, so that the unit 14 goes to a channel different than the one assigned by the site 12.

The channel assigned by the booster 20 to the unit 14 is one of the fixed channels associated with an available pair of signal paths, such as 22b, 24b. That pair is then be set up to translate and repeat between the donor site 12 and the candidate unit 14.

To repeat a digital conversation from cell site 12 to unit 14, the forward path 22b, under the control of microprocessor 60a, repeats all time slots of the conversation. The unit 14 responds to only the assigned time slot. Since the repeated channel is transmitted at a different frequency than is the donor channel, subscriber units or other units operating in direct communication with the donor site 12 on the same donor channel, but in different time slots, are not interfered with.

To repeat a digital conversation from unit 14 to cell site 12, the reverse path, for example, IF amplifier 24b matches the candidate subscriber unit's transmission, and provides gain only during the appropriate time slot(s). This prevents interference with other subscriber units transmitting to the donor site 12 directly on the same channel but in different time slots.

Any extra time delay introduced by the repeater 20 forward and reverse path is automatically compensated for by the donor site 12. The repeated subscriber unit 14 merely appears to be further away than it actually is. Multiple digital subscriber units which were assigned to the same donor channel (but different time slots) may be handled while in the coverage area of repeater 20 using a single channel pair, such as 22b, 24b, by having the reverse channel 24b of the pair repeat the transmission from the unit 14 during the appropriate multiple time slots.

To identify units that move into the coverage area of the repeater 20 with a digital conversation in progress, the unit transmit signal is monitored by repeater 20 for signal strength above a settable threshold. Once a threshold is crossed, the signal from that unit received in an appropriate channel such as 24c is decoded via control unit 60 and microcomputer 60a. The time slot being used by the unit can then identified.

Signal path 24f and power amplifier 32f are used to transmit a signal to cause a movable unit or subscriber unit, such as 14, that has moved into the area of coverage of the repeater 20 with a digital conversation in progress to change to a different RF channel. The transmitted signal is modulated with a valid digital traffic or message channel stream.

The time slot for the subject subscriber unit contains a handoff message. The other time slots contain encoded quiet audio. Normally, only the subject unit detects the repeater transmission.

Subscriber units operating in other time slots continue to respond to the transmission of the cell site 12. The method may also be used for mobiles identified as originating or answering candidates, as noted above.

To handoff units which move away from the repeater coverage area back toward the donor cell 12, the forward transmission path 22b, for example, is interrupted and a handoff message is transmitted instead. This sends the mobile back to the channel pair originally assigned by the cell site 12.

To handoff units which move away from the coverage area of repeater 20 back towards a neighboring cell site, other than the donor site 12, the repeater 20 merely continues to repeat until the signal for the unit 14 disappears. The cellular system itself will effect this handoff.

When the bit error rate received by the cell site 12 from the repeater 20 drops, it sends a message to the unit 14 directing it to take signal strength readings on channels in neighboring cells. The mobile takes readings and reports the results.

The donor site 12 then decides which adjacent cell to send the mobile to and sends the mobile 14 a handoff message. This message is repeated intact by the repeater 20, and the unit 14 simply leaves the repeated channel assigned by the repeater 20 and goes to the newly assigned channel in the neighboring or adjacent cell.

Figure 3:
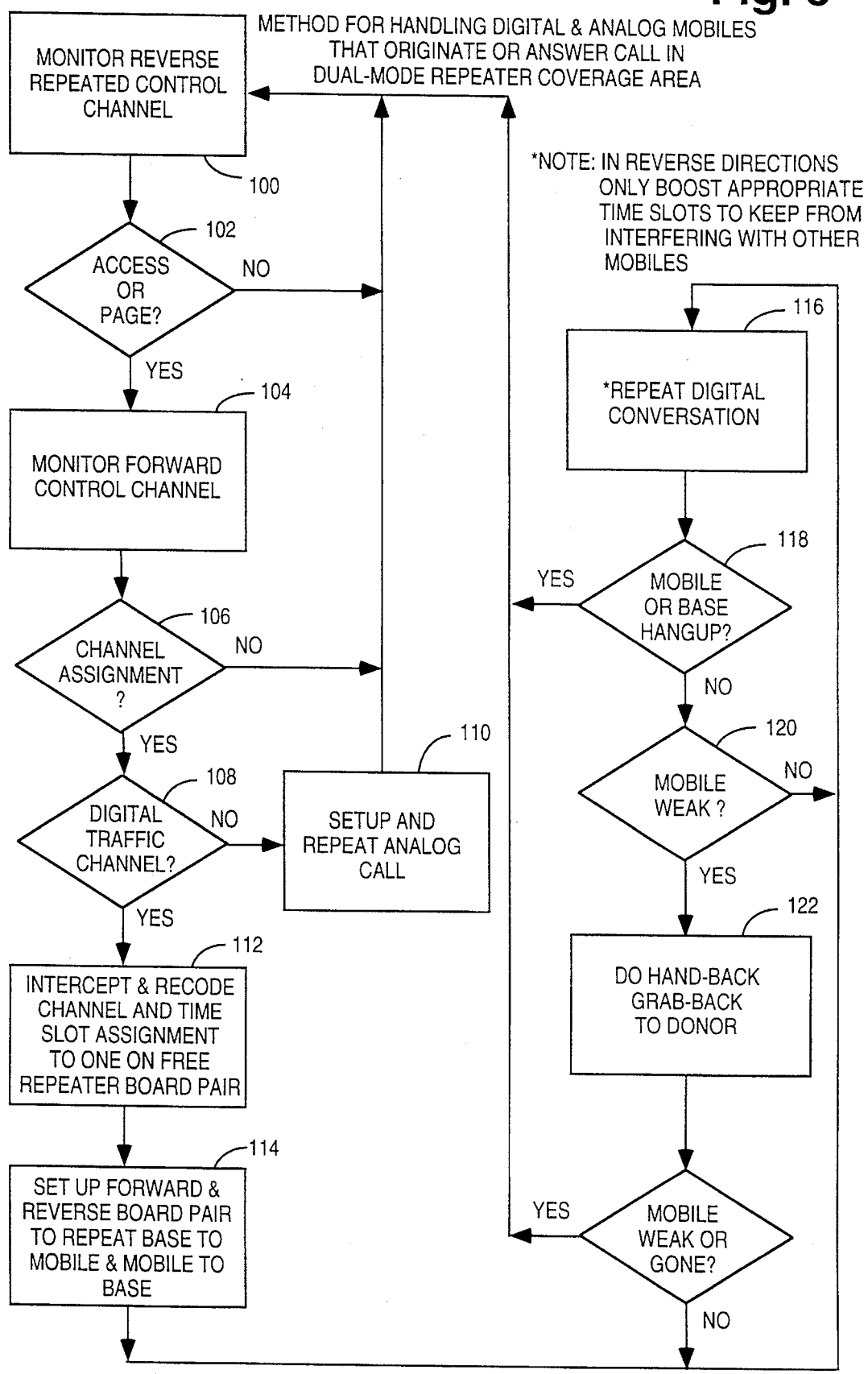
FIG. 3 is a flow diagram of a method of sensing, amplifying, and retransmitting messages in a digital format in accordance with the present invention.

FIG. 3 illustrates a dual-mode method, as described above, for repeating, using the control element 60 and microcomputer 60a. Both digital and analog calls that are originated or answered in the coverage area of the dual-mode repeater 20 can be repeated at the same time. The flow diagram of FIG. 3 illustrates steps to service those subscriber units which originate communications to, or answer transmissions from, the cell site 12.

In a step 100, the reverse repeated control channel transmitted from the subscriber unit 14 is monitored by means of, for example, narrow-band IF channel 24a operating under the control of microcomputer 60a. In a step 102, a determination is made by the booster 10 as to whether or not an access or a page-type control message has been detected as a result of the monitoring step 100.

If an access or a page response has been received in the step 102, the booster 10, utilizing narrow band IF amplifier system 22a, for example, operating under control of the microcomputer 60a, monitors the forward control channel transmitted from the cell site 12 in a step 104. In a step 106, a determination is made as to whether or not a channel assignment has been detected on the forward control channel from the cell site 12.

If a channel assignment has been detected in the step 106, the control unit 60 and microcomputer 60a determine whether or not that channel assignment corresponds to a predetermined digital traffic channel in a step 108. If the channel assignment of step 106 is to an analog traffic channel, in a step 110, the control unit 60 and microcomputer 60*a* set up a forward and reverse message transmission paths, utilizing, for example, narrow band IF paths 22*b*, 24*b*, and then repeat the analog communication. Details of the steps of repeating the analog communication can be found in the above-noted Leslie et al. patent.

In the event that a digital traffic channel has been detected in the step 108, in a step 112, the booster 10 alters the channel assignment to a digital channel supported by a pair of the members of the pluralities 22, 24, for both forward and reverse directions. The altered channel assignment and time slot assignment are then transmitted to the subscriber unit 14, which in response thereto, switches to the forward and reverse channel pairs assigned by the booster 10. The subscriber unit 14 communicates to and from the booster 10 in accordance with the allocated time slot assignment.

At the same time, the booster 10, in a step 114, sets up the necessary forward and reverse narrow band intermediate frequency channels from the pluralities 22, 24, so as to forward communications from the cell site 12 to the subscriber unit 14, and to receive communications from the subscriber unit 14 and forward same to the cell site 12 on the channel assigned by the cell site 12.

In a step 116, the digitized communication on the booster assigned message channel is amplified and repeated on the frequency assigned by the cell site 12, in the reverse direction, but only during the time slot assigned to the subject subscriber unit. As a result, there will be minimal interference with other subscriber units assigned to the same reverse channel by the cell site 12, but to a different time slot or slots.

In a step 118, the booster 10 determines whether or not the communication has been terminated. If so, the process returns to the step 100. If not, a determination is made in a step 120 as to whether or not the signal strength received from the subscriber unit 14 exceeds a predetermined threshold.

If the signal from subscriber unit 14 fails to exceed the predetermined threshold, in a step 122 the booster 10 redirects the subscriber unit 14 to the message channels originally assigned by the cell site 12. The cell site 12 in turn will carry out a handoff operation as is normal and conventional in cellular systems.

Figure 4:
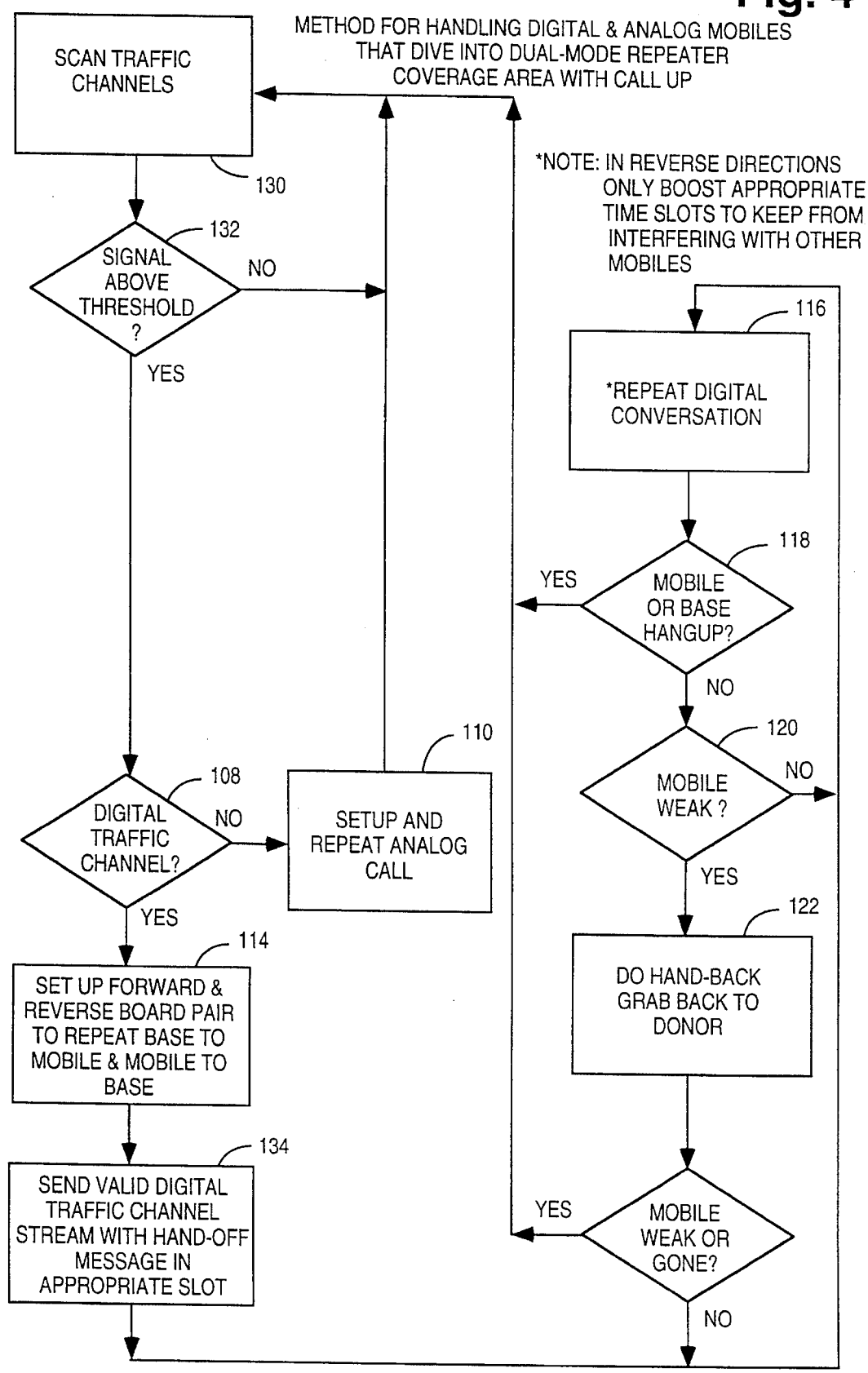
FIG. 4 is a flow diagram of a method in accordance with the present invention, of processing an ongoing call for a movable unit which enters the booster coverage area.

FIG. 4 is a flow diagram of a method of servicing both digital and analog subscriber units, such as the unit 14, that move into the service area of the repeater 10 while communications are in process with the cell site 12. Those steps of FIG. 4 which correspond to previously discussed steps of FIG. 3 have been given the same identification numerals.

In a step 130, the booster 10 scans traffic channels which the cell site 12 has previously assigned to subscriber units carrying on communications therewith. In a step 132, the received radio signal strength of active traffic channels transmitted from subscriber units, such as the subscriber unit 14, are measured to determine whether or not the corresponding signals exceed a predetermined threshold. If so, in the step 108, a determination is made as to whether or not a digital traffic channel has been detected.

Digital traffic channels can be detected by examination of a previously stored list within the booster 10, which defines channels associated with the cell site 12 which are designated for digital traffic.

In the step 114, the booster 10 sets up the forward and reverse signal paths utilizing pairs of narrow band IF amplifiers from the pluralities 22, 24. In a step 134, the booster 10 creates and transmits to the subject subscriber unit a digital handoff message in the appropriate time slot of the traffic channel stream which has been assigned to the subject subscriber unit. The subject subscriber unit then switches to the channel pair assigned by the booster 10 and is serviced by the booster as previously described with respect to steps 116–122.

Thus, with respect to the method of FIG. 4, the booster 10 will continue to amplify and repeat digitized representations of the communications between the subscriber 14 and the cell site 12, and transmit those to the cell site 12 on a frequency assigned by the site 12, and in one or more time slots assigned by the cell site 12.

During time slots assigned to other subscriber units, the booster 10 does not transmit an interfering signal in the reverse direction.

From the foregoing, it will be observed that numerous variations and modifications may be effected without departing from the spirit and scope of the novel concept of the invention. It is to be understood that no limitation with respect to the specific apparatus illustrated herein is intended or should be inferred. It is, of course, intended to cover by the appended claims, all such modifications as fall within the scope of the claims.

What is claimed is:

1. A method of providing service in a radio telephone system to analog and digital subscriber units comprising:

detecting the presence an electromagnetic signal of a first frequency carrying at least one digitized communication between the system and one of the digital subscriber units;

establishing amplification paths between the system and the unit;

sending a control message to the unit directing it to communicate with the system at a second frequency;

repeating the digitized communication from the unit to the system without interfering with the other digitized communications carried by the electromagnetic signal; and repeating at least one analog communication between the system and an analog subscriber unit simultaneously with repeating a digitized communication.

2. A booster usable to provide improved service to analog or digital subscriber units using a cellular-type radio telephone system comprising:

at least one amplifier for transmitting radio frequency signals from the system to one or more selected units;

at least one amplifier for transmitting radio frequency signals from the one or more selected units to the system;

means, coupled to said amplifiers, for detecting a service requesting message from one digital subscriber unit;

control means coupled to said detecting means and said amplifiers for selectively boosting digital communications from the one digital subscriber unit and transmitting same to the system without interfering with other digital subscriber units which are in communication with the system; and means for boosting analog signals associated with one or more analog subscriber units simultaneously while boosting at least the one digital subscriber unit.

3. A repeater usable to repeat signals which carry a digital or an analog representation of a message between a fixed remote transmitter/receiver and a movable unit comprising:

a first plurality of separate signal paths for receiving signals from the fixed transmitter/receiver and for retransmitting signals to the movable unit;

a second plurality of separate signal paths for receiving signals from the movable unit and for retransmitting signals to the fixed transmitter/receiver;

a control unit coupled to both of said pluralities with said control unit including circuitry for enabling a received signal which carries a digital representation of a message to be retransmitted by one of said signal paths and including circuitry for enabling a received signal which carries an analog representation of a message to be retransmitted by another of said signal paths; and circuitry for changing a frequency parameter of a received signal which carries a digital representation from a first value to a second value, while leaving a time slot parameter unchanged, when a corresponding signal is being transmitted.

4. A repeater as in claim 3 wherein said control unit includes means for determining if a digital representation or an analog representation is to be retransmitted.

5. A method of providing service in a radio telephone system to analog and digital subscriber units comprising:

detecting the presence of an electromagnetic signal of a first frequency carrying at least one digitized communication between the system and one of the digital units;

establishing amplification paths between the system and the unit;

sending a control message to the unit directing it to communicate with the system at a second frequency;

repeating the digitized communication from the unit to the system without interfering with the other digitized communications carried by the electromagnetic signal;

wherein the repeating step includes determining a digital time slot to which the system has assigned the unit, and using that determined time slot in each amplification path between the system and the unit; and repeating at least one analog communication with an analog subscriber unit while repeating the digitized communication.

6. A method of providing service in a radio telephone system to analog and digital subscriber units comprising:

detecting the presence of an electromagnetic signal of a first frequency carrying at least one digitized communication between the system and one of the digital units;

determining whether an analog or a digitized communication is to be retransmitted, and, if a digitized communication is to be retransmitted, then, executing the following steps;

establishing amplification paths between the system and the unit;

sending a control message to the unit directing it to communicate with the system at a second frequency;

repeating the digitized communication from the unit to the system without interfering with the other digitized communications carried by the electromagnetic signal;

monitoring control messages from the system to one or more subscriber units;

determining if the assigned frequency corresponds to a digitized message format, and in response thereto, determining a time slot to which the system has assigned the subscriber unit, and transmitting an assignment to the subscriber unit directing it to a different frequency also associated with a digital message format, while leaving the assigned time slot unchanged; and repeating digitized messages received from the unit at the different frequency by amplifying them during the assigned time slot associated therewith and transmitting those amplified digitized messages to the system at the assigned frequency.

7. A booster usable in a cellular radio telephone system between a cell site and a cellular subscriber unit comprising:

a first plurality of narrow band signal paths for retransmitting analog or digital signals from the cell site to the movable unit;

a second plurality of narrow band signal paths for retransmitting analog or digital signals from the movable unit to the cell site;

a control computer circuitry, coupled to said pluralities, including means for determining whether an analog or a digital representation of a message is to be retransmitted and circuitry responsive to said determination for retransmitting at a selected frequency, on a selected signal path of said second plurality, a digital representation of a message from the unit wherein said circuitry enables said selected signal path only during a predetermined time period assigned to that unit, such that minimal interference is caused to other units transmitting to the cell site at said selected frequency; and including circuitry for detecting a digital signal from the unit at a first RF frequency and for causing the unit to switch to a second frequency assigned by said control computer circuitry, while continuing to transmit only during the predetermined time period initially assigned to that unit.

8. A repeater usable in a dual mode radiotelephone system to repeat signals which carry a digital or an analog representation of a message between a fixed remote transmitter/receiver of the system and a movable unit wherein the unit is capable of direct radio frequency communication with the fixed transmitter/receiver when outside of a service area of the repeater, the repeater comprising:

a first plurality of separate signal paths for selectively receiving the digital or the analog signals from the fixed transmitter/receiver and for retransmitting signals to the movable unit;

a second plurality of separate signal paths for selectively receiving the digital or the analog signals from the movable unit and for retransmitting signals to the fixed transmitter/receiver; and a control unit coupled to both of said pluralities with said control unit including circuitry for enabling a received signal which carries a digital representation of a message to be retransmitted by one of said signal paths wherein said control unit directs the movable unit to communicate directly with the fixed transmitter/receiver if the unit moves out of the service area of the repeater.

9. A booster usable in a cellular radio telephone system between a cell site and a movable cellular unit comprising:

a first plurality of signal paths for selectively retransmitting into a booster coverage area analog or digital signals from the cell site to the movable unit;

a second plurality of signal paths for selectively retransmitting analog or digital signals received from the movable unit when that unit is in the coverage area of the cell site;

a control panel component, coupled to said pluralities, including circuitry for monitoring a digital message channel assignment from the cell site directed toward the movable unit, for altering said assignment and for retransmitting said altered digital channel assignment to the movable unit whereupon, the movable unit will switch to a booster specified channel and wherein said control component causes the unit to communicate directly with the cell site if it leaves the booster coverage area.

* * * * *